United States Patent Office 2,784,532
Patented Mar. 12, 1957

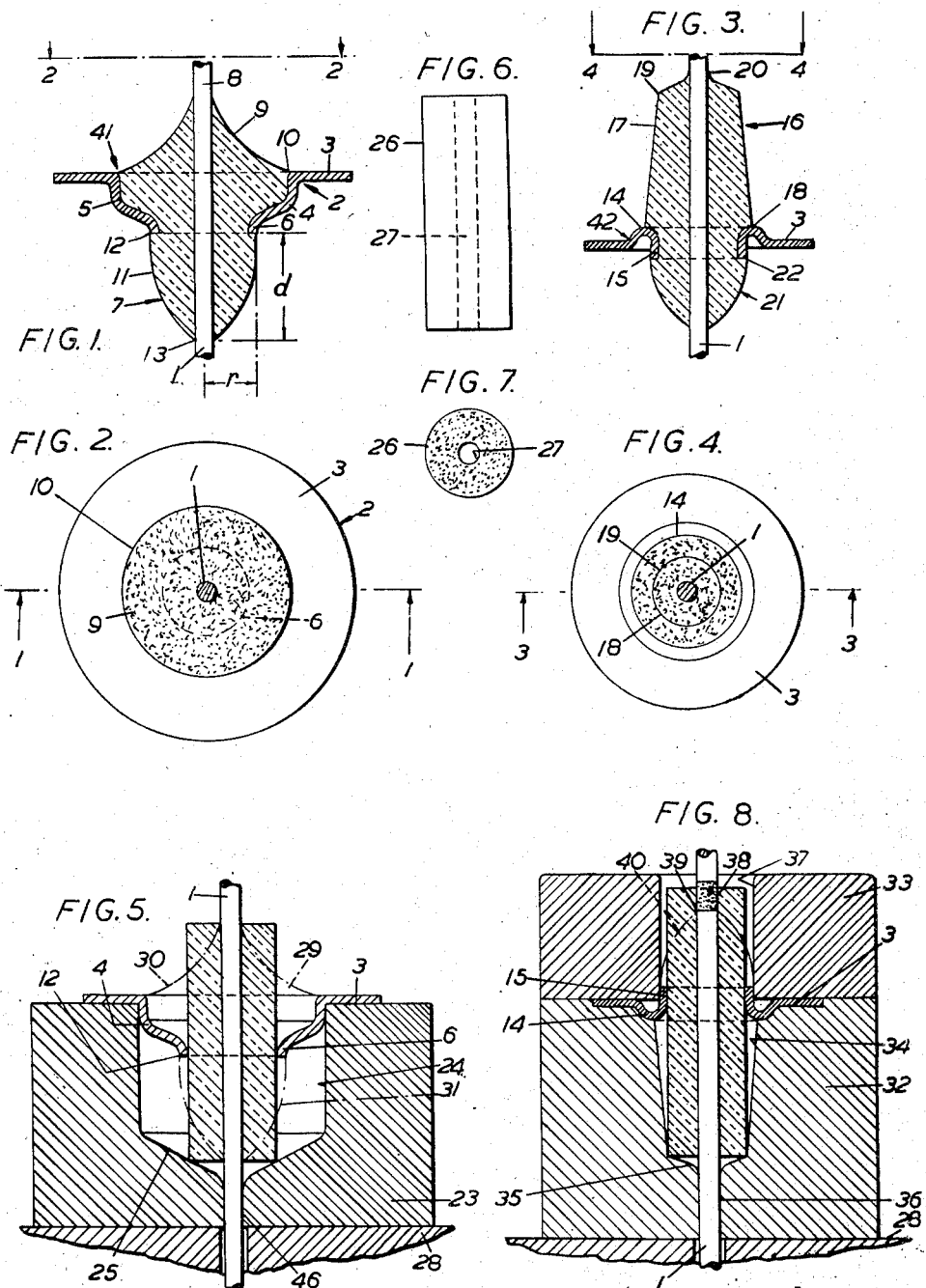

2,784,532

METHOD FOR MAKING ELECTRICAL TERMINALS

Thomas William Griffiths, Newark, N. J., assignor to International Telephone and Telegraph Corporation, a corporation of Maryland Original application June 21, 1946, Serial No. 678,173. Divided and this application March 5, 1952, Serial No. 276,727

1 Claim. (Cl. 49—81)

This is a divisional application of my parent application Serial No. 678,173, filed June 21, 1946, now abandoned.

This invention relates to electrical terminal devices and more particularly to electrical terminals of the type which are carried through glass seals.

The principal object of the invention is to provide a method for making a terminal of this type which provides a high degree of insulation and relatively great strength of the sealing means.

It has been a practice to carry an electrical terminal rod through a glass seal, such as a glass bead which is sealed through an aperture in a suitable supporting device such as a metal base or cap or the like. Difficulty has sometimes been encountered, however, in carrying out this practice. An important difficulty has been the lack of strength of the construction. For example, a blow on the protruding end of the terminal has sometimes resulted in shattering of the glass bead and consequent disruption of the terminal. Another disadvantage has been that the shortness of the path along the surface of the bead from the terminal to the supporting base has sometimes permitted a substantial amount of electrical leakage along the surface of the glass forming the seal.

One expedient which has heretofore been proposed in an attempt to provide a greater surface and strength of the seal has been to soften or melt a rather thick rod of glass above a metallic aperture through which the terminal is to be sealed, and allow the glass to droop down through the aperture to form a bead below it. Although such a seal has considerable merit, it has the disadvantage that the bead formed by the glass drooping below the aperture has not had as great a surface as is desirable, and furthermore has not provided as much strength as is desirable.

By means of my present invention, I overcome the foregoing disadvantages by a construction providing great strength coupled with a long path along the glass between the terminal and the supporting base member. Furthermore, I provide a strong, resilient construction which tends to avoid shattering of the parts and resists mechanical shock.

I carry out my invention by the provision of an elongated shape of the sealing glass, such that the glass extends for a relatively great distance along the terminal member and provides a considerable extent of glass from the extremity of the sealing of the glass to the terminal and to the base. To facilitate the sealing, the metallic base member is preferably of a curved annular construction.

According to a feature of my invention, I insert a terminal rod or member through a central hole passing through a glass rod which is inserted through the aperture of the base member or cap by which the seal is to be held; and I provide means for supporting the metallic aperture and providing space for the glass rod to flow into when it is heated and softened. Then, by softening the glass in an oven, it flows into the desired shape.

According to a specific variation of the foregoing feature, I use a mold shaped according to the desired shape of at least part of the glass seal, so that when the glass is melted it flows enough to fill the mold and provide the desired shape. A feature is that the softening causes a desired flowing and rounding of the surfaces of the glass, causing it to adhere in a desired manner to the aperture and to the terminal.

The foregoing and other features of my invention will be better understood from the following detailed description and the accompanying drawings of which:

Fig. 1 is an elevation view in cross section, taken at line 1—1 of Fig. 2, of a sealed terminal constructed according to my invention;

Fig. 2 is a cross section view, taken at line 2—2 of Fig. 1;

Fig. 3 is an elevation view in cross section, taken at line 3—3 of Fig. 4, showing a modified form of sealed terminal according to my invention;

Fig. 4 is a cross section view, taken at line 4—4 of Fig. 3;

Fig. 5 shows apparatus and a method of forming a seal, constructed according to Figs. 1 and 2;

Fig. 6 is an elevation view of a glass rod used in making the seal according to Fig. 5;

Fig. 7 is a top view of the glass rod shown in Fig. 6; and

Fig. 8 shows apparatus and a method of molding a glass seal to provide the construction shown in Figs. 3 and 4.

In the sealed terminal arrangement of Figs. 1 and 2, there is shown a terminal rod 1 of a suitable metal such as Kovar, passing through an aperture formed through a metallic supporting member 2, which may also be of a convenient sealing material such as Kovar. The apertured member is in the form of a flat plate 3, having an annular depending collar portion 4 curved to form an inwardly protruding flange member 5, and ending in a lower circular lip 6. The sealing glass 7 is in the form of an elongated seal extending through a substantial length of the rod 1, beginning at an upper point 8 above the aperture and falling downwardly and outwardly, forming a surface of revolution in a concave curved shape 9 to the upper end of the aperture plate. The lower part of the sealing glass is in the form of an elongated convex surface of revolution 11 starting at the outer edge 12 of the lower lip 6 of the aperture, and extending downwardly in the form of an elongated convex bead to a point 13 on the rod 1 well below the aperture. The distance $d$ in the axial direction of the rod is substantially greater than the maximum radius $r$ of the lower bead, thereby providing a path of considerable length from lip 6 to point 13. The length of the path along concave surface 9 from point 10 to point 8 is preferably about the same as the length of path from point 6 to point 13. This provides long electrical leakage paths from the support 2 to the terminal rod.

The composition of the glass should be one which really seals to the terminal rod and to the base support. Suitable glass compositions for this purpose, including those especially suited for sealing to Kovar metal are well known, and need no further discussion here.

In Figs. 3 and 4, which show another modification of a sealed terminal constructed according to my invention, the terminal rod 1 is carried through an aperture which is shaped somewhat different from that in Figs. 1 and 2. In Fig. 3, the aperture is extruded through the flat plate 3 so as to provide a raised curved bead 14 having a depending lip 15. The glass seal member 16 is shaped somewhat different from the glass member in Fig. 1, since the upper part is in the shape of substantially a cylinder 17, which is tapered upwardly slightly conically from a point 18 at substantially the top of the bead 14, to a region 19 which is almost flat, although extending upwardly slightly conically to a point 20 which is the uppermost point of sealing to the rod 1.

The lower portion 21 of the sealing glass is in the elongated convex bead-like shape, substantially like the lower portion of the seal in Fig. 1. As in Fig. 1, the lower section 21 extends to the outer surface of the lower lip 15 of the aperture, being sealed to the outer edge 22.

Fig. 5 shows an arrangement by which the form of seal shown in Figs. 1 and 2 may be made. There is used a block 23 of a refractory material, such as carbon, and the block is provided with a cylindrical bore or opening 24, large enough in diameter to accommodate the flange 4 of the aperture plate, while allowing the top portion 3 to rest on the top of the block, the flange 4 fitting nicely within the hole 24. The lower end of the hole 24 is carried inwardly and downwardly on a tapered surface 25 to a central hole 46, large enough in diameter to receive the terminal rod 1.

The glass sealing substance is provided by a solid cylinder 26 of the sealing glass as shown in Fig. 6, the glass cylinder being of the proper diameter to fit nicely through the lip 6 of the aperture, and being provided with a central hole 27 of the proper diameter to receive the rod 1.

The rod 1 is inserted through the hole 27 and into the bore or hole 46 of the refractory block; and the glass cylinder 26 is fitted through the lower lip 6 of the aperture member, the device is held securely by the block arrangement. In this condition, the block containing the terminal rod and glass cylinder is placed on a platform 28 in an oven, which is brought to a sufficiently high temperature to soften the glass.

The temperature to which the oven is raised will depend in large measure upon the composition of the glass. It is desired that the heating shall be just sufficient to soften the glass, causing it to sag and flow somewhat, but not sufficient to melt the glass and allow it to flow freely into all the cavities and places within the block. By carefully controlling the temperature of the oven in this way, and using sufficient time, the softening of the glass is accompanied by a change in shape from the cylindrical form of the glass rod to the form shown by the dotted lines 30 and 31 in Fig. 5. Thus, the upper portion of the cylindrical glass rod will seal to the terminal rod at the upper extremity of the glass, as soon as the temperature is raised high enough, and the outer edges will then sag somewhat, sufficient to fill the annular space 29 between the cylindrical rod and the flange 4 of the aperture. When the glass flows down into this space, it seals to the metal of the aperture.

At the same time, the glass below the aperture tends to flow out somewhat to the outer edge 12 of the lower lip of the aperture, thereby rounding out according to the dotted line 31 in Fig. 5. In this way, the seal takes the form shown in Fig. 1.

The seal shown in Figs. 3 and 4 may be made in a somewhat similar manner to that in Figs. 1 and 2, although this form is a molded form rather than a flowed form of seal. The temperatures used will be higher than in the case of Fig. 5, and the glass will actually be melted and caused to flow. For this purpose there is provided a lower carbon block 32 and an upper block 33. The lower block is provided with a well 34 with tapering sides as shown, and terminating in the almost flat conical taper 35, the lower end of this well terminating in a hole 36 large enough to receive the terminal rod 1. The block is suitably rounded so that it snugly fits the flange 14 of the aperture member when it is laid on the top of the block in an inverted position. The upper block 33 is provided with a cylindrical opening or hole 37 of such a diameter that it fits snugly against the outer surface of the depending lip 15, and is fitted closely over the plate 3.

Before the terminal rod 1 is passed through the glass cylindrical member 26, the upper part of it is first coated with a coating material 38 down to a point 39, this coating material being of a nature well known in the art which will prevent the glass from sealing to it when the glass is melted. When the carbon blocks containing the structure are placed on the platform 28 in the oven, and the oven temperature turned up above the melting point of glass, the glass will flow, filling the space 34 between the cylindrical glass rod and the wall of the well in carbon block 32. The glass required to fill this space will come from the upper portion of the cylindrical glass rod above the aperture; and accordingly, the glass will tend to drop down into the lower well to fill the space. In dropping down, it will not seal to the coated portion 38 of the terminal rod, but will only start to seal at the uppermost portion 39 which is at the lower end of the coating. Since the sealing starts at this point, the glass will then tend to drop down and form the convex surface 40 represented by the dotted lines in Fig. 8; and the glass will extend downwardly and outwardly to the outer edge of the lip 15, as shown. When the glass has reached this position, the heat may be turned off, and it may be allowed to solidify, thereby remaining in the shape shown by the dotted line 40 and by the shape of wall 34 of the well. This is the shape shown in Fig. 3.

In the arrangement of Fig. 8, the upper curved block tends to shield the upper part of the seal from the heated platform 28 so that it does not melt and run to as great a degree as at the lower part of the seal. In consequence, the upper part tends to hold its position better and form into the curved rounded shape which is shown, while the lower part is more thoroughly melted to run and fill the lower cavity.

After the glass has been molded and formed into the shape of Fig. 3 by this procedure, it should preferably be annealed while in the mold by continuing to heat it at a temperature somewhat below the melting point for a period of time, after which it may be cooled and then removed from the mold. The somewhat tapered shape of the portion 16 will facilitate the removal from the mold.

The best temperatures to use for causing the glass to flow will depend somewhat on the size of the glass used, which in turn will depend on the size of the aperture through which it is to be set. Not only will the best temperature depend upon the size of the glass piece, but as noted before, will also depend on the type or composition of the glass, since the melting points of different compositions will be different. Moreover, the best operating temperature will also be determined in some degree by the annealing characteristics of the glass, and atmospheric conditions and the particular ultimate shape and proportions which it is desired to impart to the surfaces.

In both the arrangements of Figs. 5 and 8, the terminal rod 1, resting directly on the hot platform 28, gets hotter than the carbon blocks so that the rod is the hottest part. This tends to cause the glass to seal readily to the rod at the extremities shown, which facilitates the forming and warping of the glass into its desired configuration.

It will be recognized that by my invention, I have provided an especially satisfactory form of seal for a terminal member and a method of forming it. The seal is both tough and durable, and has the marked advantage of providing large electrical leakage paths which provides the desired high resistance between the terminal and the supporting base. The form of seal moreover, is resilient; and even though cracks should tend to form in the glass, they generally tend to form only around the edges or flanges where they do not materially damage the effectiveness of the seal. For example, in Fig. 1, such cracks as may tend to form will most likely occur around the upper periphery at position 41, just inside the flange 4.

The particular combinations of the seal and aperture of Fig. 3 is especially advantageous because the rib 18 provides a very high degree of resilience. In the event of a tendency to bend the rod 1 or knock it sideways, the aperture plate will tend to give at position 42 thereby minimizing the likelihood of breakage of the seal.

Although only two forms of seal according to my invention are illustrated herein, it will be recognized that the invention is not limited to these forms, but only in accordance with the appended claim.

Furthermore, it will be recognized that the form of terminal and seal is applicable to a multiple terminal arrangement. For example, it is sometimes desirable to have a plurality of terminals pass through the cover of a hermetically sealed casing. The practice of my invention may be used for this purpose by providing the cover plate with the desired number of apertures of the type described herein and providing a terminal and seal through each aperture. The heating arrangements in Figs. 5 and 8 may be readily modified to provide the desired number of accommodations or holes for the number of apertures of the plate.

I claim:

The process of sealing an electrical conductor to a base member by mounting the conductor in a tubular glass member and positioning the glass member and conductor snugly in an aperture in the base member, whereby the base member is located intermediate the ends of the tubular glass member, and mounting the tubular member and conductor within a heating mold which completely surrounds said glass member and conductor, which process comprises applying heat to said mold in sufficient degree to cause the glass member on both sides of said base member to become sufficiently fluid to make sealing contact therewith and with said conductor, to cause the glass on one side of said base member to become fluid only to the extent that the diameter thereof is maximum at the base member and gradually decreases at is extends away therefrom, and to melt the glass on the other side of said base member, to fill the surrounding cavity of the mold.

References Cited in the file of this patent
UNITED STATES PATENTS

| | | |
|---|---|---|
| 230,709 | Lomax | Aug. 3, 1880 |
| 732,812 | Anderson | July 7, 1903 |
| 1,562,533 | Weintraub | Nov. 24, 1925 |
| 2,071,597 | Vasselli | Feb. 23, 1937 |
| 2,125,315 | Ronci | Aug. 2, 1938 |
| 2,174,374 | Beggs | Sept. 26, 1939 |
| 2,299,750 | Hull et al. | Oct. 27, 1942 |
| 2,318,435 | Stopakoff et al. | May 4, 1943 |
| 2,338,538 | Pulfrich et al. | Jan. 4, 1944 |
| 2,496,303 | Morse et al. | Feb. 7, 1950 |